United States Patent
Scarpetti et al.

[19]

[11] Patent Number: 5,905,199
[45] Date of Patent: May 18, 1999

[54] TIRE MARKING METHOD

[75] Inventors: Giancarlo Scarpetti; Paolo Piacente; Roberto Matteo, all of Rome; Maurizio Copparoni, Aprilia, all of Italy

[73] Assignee: Bridgestone Corporation, Tokyo, Japan

[21] Appl. No.: 08/975,178

[22] Filed: Nov. 20, 1997

[30] Foreign Application Priority Data

Nov. 29, 1996 [IT] Italy ................... TO96A0972

[51] Int. Cl.$^6$ .................................................. E01C 23/00

[52] U.S. Cl. ................................................................ 73/146

[58] Field of Search ............................... 73/146; 157/1.1; 378/61; 451/5, 254, 920

[56] References Cited

U.S. PATENT DOCUMENTS

| | | | |
|---|---|---|---|
| 3,526,131 | 9/1970 | Buser et al. | 73/146 |
| 4,260,889 | 4/1981 | Osborn et al. | 250/358 T |
| 4,308,747 | 1/1982 | Reed | 73/146 |
| 4,670,289 | 6/1987 | Miller, III | 73/146 |
| 5,237,505 | 8/1993 | Beebe | 73/459 |

*Primary Examiner*—Harshad Patel
*Assistant Examiner*—Robin Clark
*Attorney, Agent, or Firm*—D. A. Thomas

[57] ABSTRACT

A method of marking a tire to indicate both the taper vector direction and the plane of the radial force first harmonic (RF1H) vector, whereby the tire, with its axis positioned vertically, is marked with a single mark in the RF1H plane and on the positive-taper side, i.e. on the taper vector out side, by a marking head fitted to a multiple-axis device for so moving the marking head as to cooperate selectively with one or other of two shoulders of the tire.

14 Claims, 3 Drawing Sheets

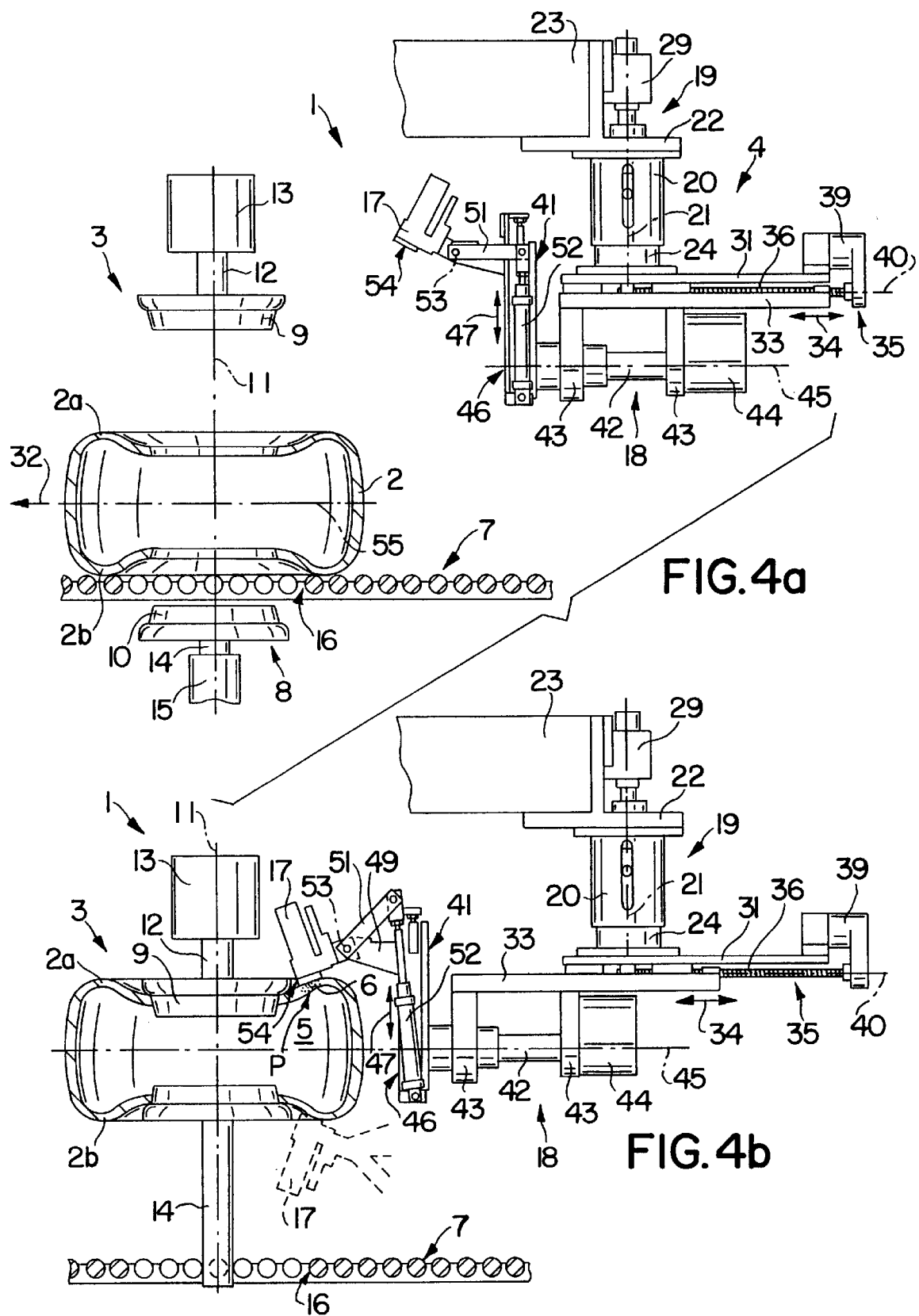

TIRE MARKING METHOD

BACKGROUND OF THE INVENTION

The present invention relates to a tire marking method.

In particular, the present invention relates to a method of marking a tire to indicate the taper vector direction and the plane of the radial force first harmonic (RF1H) vector.

Two marks are normally made on each tire coming off the production line: a first indicating the taper of the tire, which corresponds, with respect to the rotation direction and the overall extension of the tire, to the mean of the dynamic forces parallel to the rolling axis of the tire and lying in the tread plane; and a second indicating the radial anisotropy of the tire, and more specifically the point on the tire at which the maximum radial force first harmonic value is located Which point is hereinafter referred to as the "first harmonic high point", and coincides with the out point of the radial force first harmonic (RF1H) vector from the tire.

Whereas the first mark is made on the positively-tapering sidewall of the tire, the second, indicating a radial plane of a vector, is made indifferently on either one of the sidewalls Indications of this sort are important both when assembling the tire to the wheel rim—to improve wheel balance, the tire is advantageously connected vectorially to the rim so that the respective first harmonic points are opposite—and when assembling the wheels to the vehicle—each pair of opposite wheels must be assembled with opposite tapers.

In tire manufacturing plants, specimens of the tires coming off the curing line are normally sent to a so-called TUO (Tire Uniformity Optimizer) machine, which normally comprises two opposed coaxial spindles rotating about a vertical axis and located on opposite sides of a horizontal roller conveyor for successively conveying the tires laid flat, i.e. with the axis of rotation positioned vertically, and with a given face, normally the one bearing the reference numbers, facing upwards The upper spindle is normally powered and axially fixed, while the lower one is normally idle and movable axially through the roller conveyor to raise the tire off the conveyor and connect it to the upper spindle. When activated, the upper spindle rotates the tire and the lower spindle to enable the TUO to make a series of measurements and determine, among other things, the taper of the tire and the location of the "first harmonic high point."

The TUO normally operates in conjunction with a marking machine comprising a marking head located over the tire on the TUO, and which provides for making, on the upper surface of the tire, a first mark indicating the plane of the "first harmonic high point", and a second mark in the event the tire comprises an upward-directed taper vector. Conversely, in the event of a downward-directed taper vector, the second mark, which should be made on the lower surface of the tire inaccessible by the marking head, is not made, and the tire is either marked by hand or left unmarked—the absence of a taper mark being generally accepted as indicating a taper vector directed towards the lower shoulder of the tire or, in general, towards the shoulder opposite the one bearing the reference numbers.

Whichever the case, the above method involves several drawbacks: the absence of a taper mark may be interpreted wrongly; and marking the taper manually undoubtedly involves the use of skilled labour, thus increasing production cost.

SUMMARY OF THE INVENTION

It is an object of the present invention to provide a method of producing tires all bearing a precise indication of the "first harmonic high point" and taper, and which provides for overcoming the aforementioned drawbacks.

According to the present invention, there is provided a method of marking a tire to indicate the taper vector direction and the plane of the "first harmonic high point"; the tire comprising a first and a second shoulder; and the method being characterized by comprising a marking step wherein a single mark is made on the tire, in said plane and on one or the other of said shoulders depending on the taper vector direction.

BRIEF DESCRIPTION OF THE DRAWINGS

A number of non-limiting embodiments of the present invention will be described by way of example with reference to the accompanying drawings, in which:

FIG. 3 shows a front view of a detail in FIG. 2;

FIGS. 4a and 4b show side views of the FIG. 1 unit in two different operating positions.

DETAILED DESCRIPTION OF THE INVENTION

Figure 1:
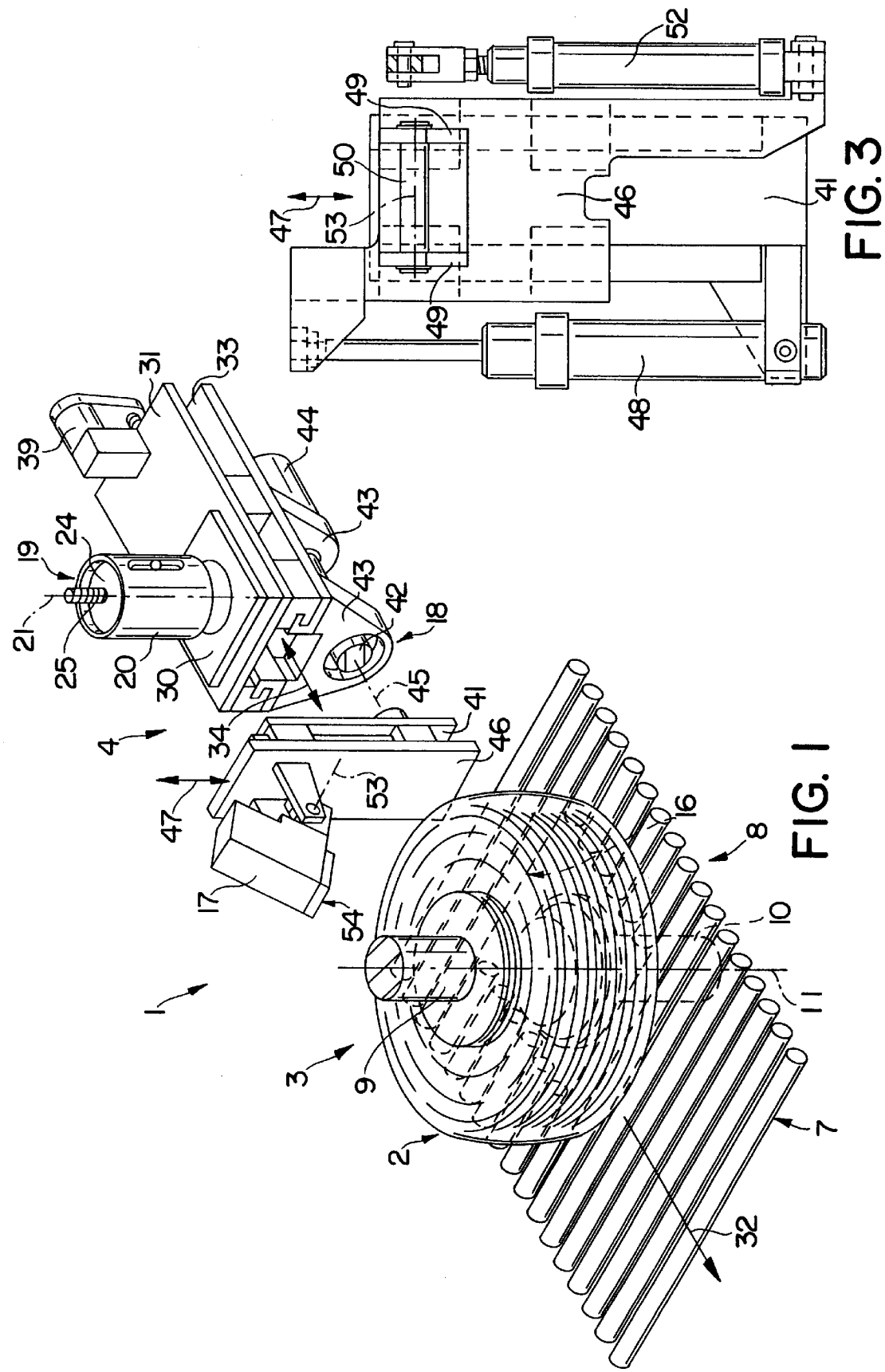
FIG. 1 shows a view in perspective, with parts removed for clarity, of a tire testing and marking unit.

With reference to FIGS. 1 and 4, number 1 indicates a unit for testing and marking tires 2, and comprising a known test machine (TUO) 3, and a machine 4 for marking tires 2. Machine 3 provides for making a series of measurements of tires 2, and determining, among other things, the taper vector direction and the location of the plane 5 (FIGS. 2 and 4b) of the radial force first harmonic (RF1H) vector; and machine 4 cooperates with test machine 3 to make a single mark 6 (FIGS. 2 and 4b) on tire 2, in plane 5 and preferably on the positive taper side, i.e. on the taper vector out side.

Machine 3 comprises a horizontal roller conveyor 7 for successively feeding tires 2, laid flat (i.e. with the axis of rotation positioned vertically), through a test and mark station 8 at which machine 4 is located; and two opposed coaxial spindles 9 and 10 rotating about a vertical axis 11 and located on opposite sides of conveyor 7. The upper spindle 9 is a powered axially-fixed spindle fitted to the output shaft 12 of a motor 13 (FIGS. 4a and 4b) and the lower spindle 10 is fitted idly to the top end of the output shaft 14 of a linear actuator 15 for moving spindle 10 axially back and forth through an opening 16 in conveyor 7 to lift the tire 2 in station 8 off conveyor 7 and connect it to upper spindle 9. When activated, spindle 9 rotates both tire 2 and lower spindle 10 to enable machine 3 to perform a series of measurements and determine, among other things, the taper and the location of the "first harmonic high point" P of tire 2.

Figure 2:
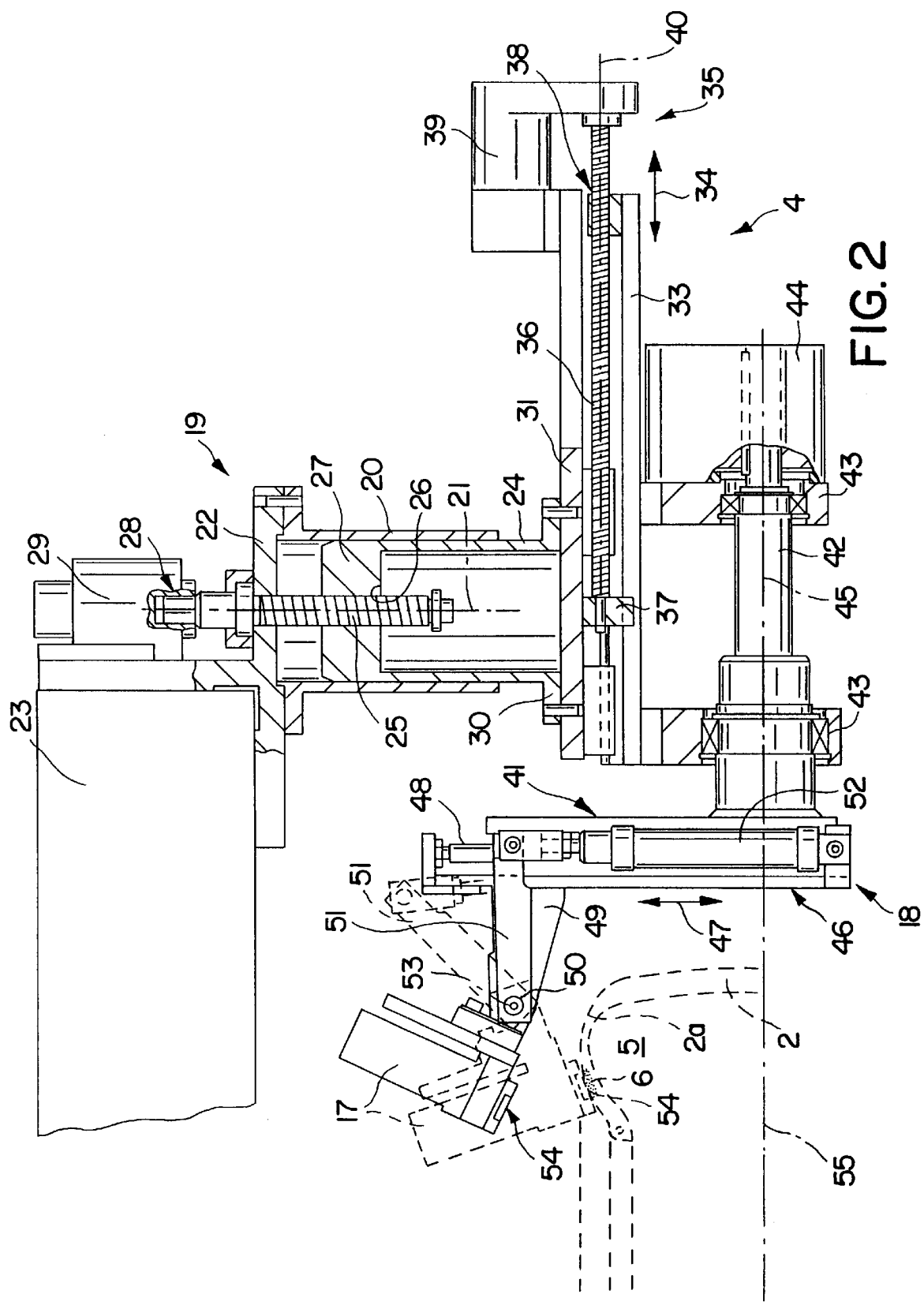
FIG. 2 shows a larger-scale, partially sectioned side view of a tire marking machine forming part of the FIG. 1 unit.

With reference to FIG. 2, machine 4 comprises a marking head 17; and an actuating device 18 for moving head 17 in space with respect to an adjustable assembly 19 supporting device 18.

Supporting assembly 19 comprises a tubular body 20 with a vertical axis 21 and closed at the top by a wall 22 connected integrally to a fixed frame 23. A piston 24 is housed in sliding and angularly-fixed manner inside body 20, and is connected to wall 22 by a screw 25 extending along axis 21 and engaging a nut screw 26 formed through an end wall 27 of piston 24. Screw 25 extends in rotary and axially-fixed manner through wall 22, and comprises, over tubular body 20, an end coupling 28 connected to the output of a motor 29 or, according to a variation not shown, engaged by a hand tool (not shown) to adjust the axial position of piston 24 with respect to body 20.

At the bottom, piston 24 comprises an annular flange 30 connected integrally to a horizontal guide 31 located over conveyor 7 and parallel to the traveling direction 32 of tires 2 along conveyor 7. The bottom surface of guide 31 is fitted with a slide 33, which is moved along guide 31 in a direction 34 parallel to direction 32 by an actuating device 35 comprising a screw 36, which is connected in rotary and axially-fixed manner to a support 37 integral with guide 31, and engages a nut screw 38 fitted to slide 33. Actuating device 35 also comprises a motor 39 fitted to guide 31, and the output of which is connected to one end of screw 36 to rotate it about an axis 40 parallel to direction 34. In an embodiment not shown, motor 39 is eliminated, and the free end of screw 36 comprises a shank (not shown) engaged by a tool or handwheel to operate screw 36 manually.

In addition to guide 31, slide 33 and actuating device 35, device 18 also comprises a plate 41 located over conveyor 7 and perpendicular to conveyor 7 and directions 32 and 34. Plate 41 is connected integrally to one end of a shaft 42 fitted in rotary manner to slide 33 by means of two supports 43 and forming the output shaft of a motor 44, which is fitted to slide 33 and located, together with shaft 42 and supports 43, beneath slide 33 and between slide 33 and conveyor 7 to rotate shaft 42 about and axis 45 parallel to directions 32 and 34.

With reference to FIGS. 2 and 3, plate 41 forms a guide for a slide 46, which is moved along plate 41 and in a direction 47 perpendicular to axis 45 by a linear actuator 48 interposed between plate 41 and slide 46. The top end of plate 41 opposite the end facing conveyor 7 comprises a fork 49 projecting from plate 41 towards machine 3 in a direction substantially parallel to directions 32 and 34, and supporting for rotation a pin 50 crosswise to direction 47. Pin 50 supports head 17 and one end of a lever 51 perpendicular to pin 50 and hinged at the free end to the output member of a linear actuator 52 interposed between lever 51 and plate 41, and which provides for swinging pin 50 and head 17 about an axis 53 coaxial with pin 50.

Head 17 comprises a marking member 54, which, when brought substantially into contact with shoulder 2a, 2b of a tire 2, provides for making mark 6 on shoulder 2a, 2b.

In actual use, and as shown in FIGS. 1 and 4a, tires 2 are fed by conveyor 7 in direction 32 and arrested, centered over opening 16, at station 8. The tire 2 over opening 16 is then lifted vertically by spindle 10 and connected to spindle 9, which is activated to rotate both tire 2 and spindle 10 about axis 11 to enable machine 3 to perform the measurements provided for.

While the above operations are being performed, machine 4 is maintained in an initial idle position in which axes 40 and 45 are parallel to direction 32, and head 17 is located at a higher level than upper shoulder 2a, is located upstream from tire 2 in direction 32, and is separated from axis 11 by a distance greater than the radius of tire 2. Said idle position is set by means of an initial setting of machine 4, wherein the position of piston 24 with respect to tubular body 20 is adjusted by means of screw 25 so that axis 45 is substantially located in the equatorial plane 55 of tire 2.

As tire 2 rotates between spindles 9 and 10, machine 3 determines the taper vector direction and, by means of a logic control unit (not shown), controls machine 4 so that, before spindle 9 is arrested, machine 4 performs a prepositioning movement depending on the sign of the detected taper vector.

In the event the taper vector is positive, i.e. directed upwards, screw 36 is activated to move head 17 radially forwards into an intermediate position directly over and facing shoulder 2a. Conversely, in the event the taper vector is negative, ire. directed downwards, motor 44 is activated to rotate shaft 42 by 180° about axis 45 and move head 17 from the initial idle position into a lowered position beneath the level of shoulder 2b of tire 2; and screw 36 is activated to move head 17 radially forwards into an intermediate position directly beneath and facing shoulder 2b. At this point, actuator 48 moves head 17 axially into an operating position substantially adjacent to shoulder 2a, 2b.

When the measurements are completed, machine 3 arrests spindle 9 so that axis 45 extends along plane 5; and head 17 is rotated about axis 53, by the combined action of actuator 52 and lever 51, into contact with shoulder 2a, 2b to enable marking member 54 to impress mark 6 on shoulder 2a.

Once marking is completed, head 17 is withdrawn from shoulder 2a, 2b and restored to the idle position by means of a series of movements similar to those described above but in reverse. As soon as head 17 is moved clear of tire 2, tire 2 is disconnected from spindle 9 and lowered by spindle 10 back on to conveyor 7. Obviously, in the case of a positive taper, tire 2 may be lowered on to conveyor 7 as soon as the marking operation is completed.

The marking method described affords the advantage of fully automatically impressing a single mark 6 indicating both the taper of the tire and plane 5. Moreover, the method is implemented by a machine 4, which, by featuring various axes of movement, is capable of adapting the position of head 17 accurately to the contour of shoulder 2a, 2b to be marked, and so ensuring top quality marking of any type of tire 2.

Finally, marking machine 4 described is extremely fast-operating, also by virtue of the possibility of synchronizing operation of machine 4 with that of test machine 3.

What is claimed is:

1. A method for marking a tire having first and second shoulders to indicate the taper vector direction and the plane of the first harmonic high point comprising the steps of:

providing a marking head mounted on a multiple-axis device;

selecting one of the shoulders to mark;

moving the marking head so as to cooperate with the selected shoulder; and marking a single mark on the tire in the plane of the first harmonic high point on the selected shoulder.

2. The method of claim 1, further comprising the steps of:

feeding the tire by means of a conveyor in a given direction to a test and mark station;

rotating the tire about a first axis to determine the taper vector direction and the plane of the first harmonic high point of the tire; and arresting the tire prior to the application of the mark.

3. The method of claim 2, wherein the first axis is substantially vertical and including the step of lifting the tire off of the conveyor in a direction substantially parallel to the first axis before the rotating step is performed.

4. The method of claim 1, further comprising the step of arresting the tire in position wherein the plane of the first harmonic high point faces the marking head.

5. The method of claim 1, wherein the tire has a first axis of rotation and including the step of positioning the marking head at an initial idle position where the marking head is spaced from the first axis by a distance greater than a radius of the tire.

6. The method of claim 5, wherein the first axis is substantially vertical and including the step of positioning the marking head at an initial idle position that is at a higher level than both shoulders.

7. The method of claim 6, further comprising the step of translating the marking head transversely with respect to the first axis to an intermediate position facing the selected shoulder.

8. The method of claim 7, further comprising the step of rotating the marking head about a second axis that is crosswise to the first axis from the initial idle position to a lowered position in which the marking head is located at a lower level than both shoulders; the step of rotating the marking head about the second axis occurring prior to the step of translating the marking head transversely with respect to the first axis to the intermediate position.

9. The method of claim 7, further comprising the step of moving the marking head in a direction substantially parallel to the first axis between the intermediate position and an operating position substantially contacting the selected shoulder.

10. The method of claim 9, further comprising the step of applying of the mark to the selected shoulder by moving the marking head about a third axis crosswise to the first axis.

11. A method of marking a tire having first and second sidewalls and first and second shoulders to indicate the taper vector direction of the tire; the method comprising the steps of:

presenting the tire to a test and mark station;

providing a marking head at the test and mark station;

determining the taper vector direction of the tire;

locating the positively-tapering sidewall of the tire;

moving the marking head into an operating position adjacent the positively-tapering sidewall of the tire; and marking the positively-tapering sidewall of the tire with a mark, regardless of the orientation of the tire in the test and mark station.

12. The method of claim 11, further comprising the step of locating the mark in the plane of the first harmonic high point on the positively-tapering sidewall of the tire.

13. The method of claim 11, wherein the tire has a first axis of rotation that is substantially vertically and including the step of positioning the marking head at an initial idle position that is at a higher level than both sidewalls and both shoulders of the tire.

14. The method of claim 13, further comprising the step of rotating the marking head about a second axis that is crosswise to the first axis from the initial idle position to a lowered position where the marking head is located at a lower level than both shoulders and both sidewalls when the positively-tapering sidewall is disposed lower than the other sidewall of the tire.

* * * * *